COMPOSITION FOR SKIN BEAUTIFICATION AND TREATMENT

Charles Fox, Fair Lawn, Fred S. Morshauser, Pompton Plains, and Paul Thau, Westfield, N.J., assignors to Warner-Lambert Pharmaceutical Company, Morris Plains, N.J., a corporation of Delaware
No Drawing. Filed Mar. 22, 1961, Ser. No. 97,440
4 Claims. (Cl. 167—90)

This invention relates to cosmetic compositions useful for application to the skin and relates more particularly to a new and novel cosmetic composition applicable for use in the treatment of the skin which is not only easily used but which has improved properties when used and applied to the skin.

For many years various cosmetic beauty masque compositions have been used for skin cleansing, depilatory and astringent purposes. Such compositions are commonly applied to the skin and particularly the face and neck, and are allowed to remain there for various periods of time to obtain the desired results. Recently, beauty masques in the form of a tough elastic gel have been obtained by the addition to water of a gel forming composition comprising the combination of a water soluble salt of alginic acid and a calcium salt in powder form. After the components are mixed with water the paste formed is applied to the skin and after a short time sets into a tough, elastic gel structure. The gel is formed as a result of the reaction of the alginic acid salt with the calcium ions derived from the calcium salt with the formation of calcium alginate. In the co-pending application of Charles Fox et al. entitled "Method of Treating the Skin and Composition Therefor," Ser. No. 84,520, filed January 24, 1961, and now abandoned, such a gel forming vehicle has been disclosed as a useful carrier for various cosmetic and therapeutic agents for the localized treatment of the skin.

Although such compositions are effective, they suffer certain disadvantages. Since the gel forming composition is in a solid finely-divided powder form it must be packaged in sealed envelopes to avoid absorption of moisture. Again, to produce the desired gel the contents of the envelope must be mixed with water. Although the composition is in the form of a powder of extremely fine particle size to facilitate uniform dispersion in water very rapid and thorough mixing is essential in order to convert the powder to a smooth paste and for many uses this operation is both inconvenient and troublesome.

Another limitation that has been observed is that the elastic gel structure which forms on the skin after application of the aqueous paste or suspension formed on mixing the composition with water forms dry powdery areas at the edges of the area to which it has been applied and these are somewhat difficult to remove from the skin after the treatment period. With some users these elastic alginate gels show a tendency to crack or lift away from the surface of the skin in certain areas, a phenomenon which diminishes the effectiveness of the composition in cosmetic or therapeutic skin treatment where an intimate contact of the treating agent with the skin is essential.

It is an object of the present invention to provide an alginate gel forming composition which is adapted to simple, clean and ready mixing with water prior to use.

Another object of this invention is to provide a composition which, when mixed with water and applied to the skin, forms a tough elastic alginate gel with high tensile strength and improved adhesion to the skin without lifting or cracking, even after prolonged periods of contact with the skin.

A further object of this invention is to provide a composition which may be mixed with water and applied to the skin to form an elastic alginate gel over the entire surface covered by the composition without forming any dry and powdery areas around the edges of the gel.

Other objects and the advantages of this invention will become apparent from the following detailed description.

We have now found that by combining a gel forming composition comprising a water soluble salt of alginic acid and a partially soluble calcium salt with an inert non-aqueous liquid vehicle to form a paste, the paste composition obtained may then be easily and conveniently mixed with water and when the water-modified paste is applied to the skin a tough elastic gel is formed of high tensile strength, improved adhesion to the skin and substantially no evidence of lifting or cracking, which resists undue drying where thinly applied and thus avoids the formation of dry powdery areas around the edges. Depending upon the nature and quantity of the non-aqueous inert liquid used, the compositions of our invention may range in consistency from a pourable liquid to a thick paste. These gel-forming alginate compositions thus obtained constitute ideal vehicles for various medicinal and cosmetic skin treating agents and only require the addition of water to the mixture before use.

The term "inert" as applied to the liquid vehicle employed means that the material must be entirely non-reactive with any of the constituents present in the gel-forming composition. The liquid must, of course, be non-aqueous since any water present would immediately initiate formation of a gel. The inert liquid should, however, be compatible with water; that is, it should either be water soluble or capable of being easily and uniformly dispersed in water. This degree of compatibility insures that upon the addition of the composition to water during normal use, a smooth and uniform suspension is rapidly obtained. Exemplary of water soluble inert liquids useful in forming the novel compositions of this invention are the various dihydroxy and trihydroxy alcohols such as ethylene glycol, propylene glycol, hexylene glycol, glycerine and the like as well as glycol ethers such as polyoxyethylene glycol and the like. Exemplary of those inert liquids which are readily dispersible in water are such materials as ethoxylated fatty alcohols, for example ethoxylated lauryl alcohol, the polyglycol esters, for example polyethylene glycol laurate, polyethylene glycol palmitate and the like and polyethers such as nonylphenoxypolyoxyethylene. Also included within the scope of the term "inert liquid," as used herein, are water dispersible liquid systems comprising a mixture of a wetting agent, for example ethoxylated lauryl alcohol, ethoxylated oleyl alcohol, ethoxylated lanolin fatty alcohols, polyethylene glycol monolaurate, polyethylene glycol monooleate, nonylphenoxypolyoxyethylene and the like and a hydrocarbon oil, for example mineral oil, or a fatty acid ester such as isopropyl stearate, isopropyl myristate and the like.

The gel forming components which are blended with said inert liquid to yield the compositions of our invention constitute a mixture of a water soluble salt of alginic acid, for example alkali metal and ammonium alginates, and a partially soluble calcium salt, for example calcium salicylate, calcium citrate, calcium sulfate, calcium malate and the like. Such compositions have the property, when added to water, of forming a tough, elastic gel at a rate depending upon the rate at which calcium ions are released into solution to react with alginate ions to form calcium alginate.

Since gel formation will commence at the instant that free calcium ions are present in the suspension formed upon addition of the above described composition to water, it is desirable that the composition contain a gel retarding agent in addition to the alginic acid and calcium salts. Such an agent acts to delay the rate of formation of free calcium ions in the suspension and allows the user ample time to add the water and then to mix the composition thoroughly in order to obtain the desired smooth and uniform suspension of the components in the now aqueous vehicle before gel formation begins.

Gel forming compositions as described above which comprise a water soluble salt of alginic acid and a calcium salt will form a gel upon the addition of water over a wide range of both acidic and basic pH values. Where the composition for preparing the desired beauty masque is normally alkaline, the gel retarding agent which is commonly used is a soluble phosphate salt such as trisodium phosphate and tetrasodium pyrophosphate. When such phosphate salts are used as gel retarding agents, the calcium salt present in the composition should be less soluble in water than the phosphate salt. Calcium sulfate is an inexpensive material with the requisite solubility properties and accordingly is the preferred source of calcium ions in alkaline gel forming vehicles containing phosphate salts as gel retarding agents. Upon the addition of such a composition to water, the calcium ions initially formed are removed as a precipitate of calcium phosphate. When the phosphate ions are exhausted, the calcium ions which are formed thereafter are then available for reaction with the alginate salt to form calcium alginate, thereby initiating the gel formation. The elapsed time before gelation is, accordingly, a function of the amount of the phosphate salt present. It is apparent, of course, that the calcium salt should be present in a stoichiometric excess compared to the amount of the phosphate salt to insure the availability of free calcium ions for gel formation.

Where it is desirable to utilize a gel forming vehicle having an acidic pH a gel retarding system differing from that described above must be employed. The composition should then contain a compound capable of hydrolyzing slowly to form an acid and the calcium salt selected should be a salt which is insoluble in neutral or alkaline media but is slightly soluble in acid media. Useful compounds which hydrolyze to yield acids are glucono delta lactone, galacto delta lactone, butyro delta lactone, valero delta lactone, glutaric anhydride, and the like. Calcium salts having the above described solubility properties are calcium citrate, tricalcium phosphate, dicalcium phosphate, and the like. Upon the addition to water of a composition comprising a salt of alginic acid, an acid soluble but alkali insoluble calcium salt and a compound capable of slowly hydrolyzing to form an acid, there will be no free calcium ions initially present for gel formation. As the hydrolyzable compound slowly forms acid, the pH of the suspension slowly changes to the acid side of pH 7, thereby resulting in a slow liberation of free calcium ions to initiate gel formation.

The gel forming composition may, if desired, contain inert solid fillers which serve to increase the bulk of the gel structure. The filler selected should, of course, be non-reactive with any of the substances present in the composition with such materials as talc, bentonite, silica and starch being useful. In basic systems, magnesium carbonate, calcium carbonate and zinc oxide are also useful fillers, with zinc oxide being particularly effective.

The gel forming compositions for use in the formation of beauty masques may normally contain as much as three parts by weight of filler per part of the mixture of the alginic acid salt and the calcium salt. In the compositions of our invention such large amounts of solid filler may be omitted and effective compositions can be prepared without any solid filler being present.

In preparing the compositions of this invention, between about 0.5 and about 3 parts by weight of inert liquid are used for each part by weight of the mixture of the alginic acid salt, the calcium salt and the gel retarding agent.

The compositions of our invention comprising an inert liquid and a gel forming vehicle as described above are generally satisfactory for use, but may be rendered more elegant by the incorporation of an agent designed to stabilize the composition against physical separation of the ingredients. Such stabilization is effected by blending the inert liquid with such materials as hydroxystearic acid; hydrogenated castor oil, the aluminum, zinc or magnesium stearates or oleates; the amides of fatty acids, such as stearic, palmitic, lauric and hydroxystearic acids; high molecular weight hydrocarbons such as polyethylene, polypropylene, the microcrystalline waxes; and bentonite and its derivatives. The inert liquid is heated with the stabilization agent until it is uniformly incorporated therein. Generally, about 0.25 to 5 percent by weight of the stabilization agent based upon the total weight of the composition of our invention is used. We have found that hydroxystearic acid is generally preferred.

Our novel compositions are ideal for the application of various cosmetic and medicinal treating agents to the skin. Exemplary of such agents are those materials disclosed in the co-pending application of Charles Fox et al. entitled "Method of Treating the Skin and Composition Therefor," Ser. No. 84,520, filed January 24, 1961, and now abandoned, for example dermatological agents used in the treatment of various skin disorders such as acne, eczema and the like, for example sulfur, hexachlorophene, resorcinol, resorcinol monoacetate, salicylic acid, allantoin, antibiotics and the like; keratolytic agents adapted to react with and dissolve dead proteinaceous material such as dead skin and the various well-known proteolytic enzymes may be used for this purpose; rubefacients which are counterirritants adapted to produce a heating action of the skin, for example methyl salicylate, oil of mustard and the like; and depilatories adapted to remove unwanted hair from the skin, for example the alkali, alkaline earth and ammonium thioglycollates and alkaline earth sulfides.

Our novel compositions may range in consistency from a liquid to a thick paste. Liquid compositions are conveniently packaged in various glass or plastic containers from which the contents may be readily dispensed prior to use. Pasty compositions may be readily packaged in collapsible thin metal tubes of the type used to package toothpaste, a package insuring easy dispensing of the contents. In use, the composition is mixed with between 2 and 4 times its weight of water to form a uniform suspension. Since the inert liquid present in the composition is compatible with water, rapid dispersion of the ingredients into the water is insured. As soon as gel formation commences, the composition is rapidly applied to the skin in the desired areas and forms a tough, elastic gel. It has been found that the gel structure obtained by use of our compositions has a high tensile strength and does not exhibit any tendency toward cracking or lifting from the skin. Moreover, no dry powdery material is formed around the edges of the film, and the entire film may easily be removed from the skin by peeling off as a single sheet or in several sections.

The following examples are included in order further to illustrate the compositions of our invention:

Example I

The following materials are blended in the proportions indicated:

| | Parts by weight |
|---|---|
| Potassium alginate | 2.5 |
| Propylene glycol | 10.0 |
| Sodium acid pyrophosphate | 0.02 |
| Tetrasodium pyrophosphate | 0.08 |
| Calcium sulfate | 2.50 |
| Zinc oxide | 3.00 |

Propylene glycol is exemplary of a water soluble inert liquid. The blended composition forms a pourable liquid suspension.

In use about 18 grams of the composition is added to 60 ml. water in a suitable vessel and the mixture is stirred until homogeneous. After approximately one minute, gel formation commences and the mass is then ready for application to the skin where it sets to form a tough, elastic gel.

Example II

The following materials are blended in the proportions indicated:

| | Parts by weight |
|---|---|
| Potassium alginate | 2.5 |
| Calcium sulfate | 2.5 |
| Tetrasodium pyrophosphate | 0.1 |
| Zinc oxide | 3.0 |
| Ethoxylated lauryl alcohol | 8.0 |

The ethoxylated lauryl alcohol, while water insoluble, is readily dispersible in water and is exemplary of a water dispersible inert liquid. The composition is a pourable liquid of somewhat higher viscosity than that of the composition of Example I. In use, about 16 grams of the composition is uniformly mixed with and thus suspended in 50 ml. water and is then applied as described in Example I.

Example III

The following materials are blended in the proportions indicated:

| | Parts by weight |
|---|---|
| Potassium alginate | 2.5 |
| Calcium sulfate | 2.5 |
| Tetrasodium pyrophosphate | 0.1 |
| Mineral oil | 6.0 |
| Zinc oxide | 2.0 |
| Ethoxylated lauryl alcohol | 2.0 |
| Finely divided silica | 1.0 |

The combination of mineral oil and the wetting agent, ethoxylated lauryl alcohol, represents a water dispersible liquid system and exemplifies this class of inert liquid. The composition forms a paste and is conveniently packaged in a collapsible metal tube. In use, about 16 grams of the composition is mixed with 50 ml. water by squeezing the contents from the tube and the resulting suspension is then mixed and applied as described in Example I.

Example IV

The compositions of Examples I, II and III are reformulated by heading the inert liquid system, that is, the propylene glycol, ethoxylated lauryl alochol and the mixture of minearal oil and ethoxylated lauryl alcohol, with 0.2 gram of hydroxystearic acid until uniformly incorporated therein, followed by the addition of the remaining ingredients. The resulting compositions have an enhanced stability against any physical separation of the ingredients.

Example V

The following materials are blended in the proportions indicated:

| | Parts by weight |
|---|---|
| Potassium alginate | 2.5 |
| Calcium citrate | 1.5 |
| Glucono delta lactone | 1.5 |
| Zinc oxide | 3.0 |
| Propylene glycol | 6.0 |

14.5 grams of the composition are thoroughly mixed with 45 ml. water and the mixture then applied as described in Example I.

It is understood that the foregoing detailed description is given merely by way of illustration and that many variations may be made therein without departing from the spirit of our invention.

Having described our invention, what we desire to secure by Letters Patent is:

1. A nonaqueous gel-forming system adapted to form a tough, elastic film at a slow and controlled rate when mixed with water comprising:
   (A) About 1 to 12 parts by weight of a partially water soluble calcium salt selected from the group consisting of calcium citrate, calcium sulfate, tricalcium phosphate and dicalcium phosphate;
   (B) About 4 to 50 parts by weight of an alginate selected from the group consisting of the alkali metal and ammonium salts of alginic acid; and
   (C) About 20 to 85 parts by weight of a nonaqueous inert liquid vehicle selected from the group consisting of:
      (a) Ethylene glycol, propylene glycol, hexylene glycol and glycerine;
      (b) Polyoxyethylene glycol;
      (c) Ethoxylated lauryl alcohol;
      (d) Polyethylene glycol laurate and polyethylene glycol palmitate;
      (e) Nonylphenoxypolyoxyethylene; and
      (f) A water dispersible liquid system comprising a a mixture of:
         (a') a wetting agent selected from the group consisting of ethoxylated lauryl alcohol, ethoxylated oleyl alcohol, ethoxylated lanolin fatty alcohols, polyethylene glycol monolaurate, polyethylene glycol monooleate and nonylphenoxypolyoxyethylene;
         (b') mineral oil; and
         (c') a fatty acid ester selected from the group consisting of isopropyl stearate and isopropyl myristate.

2. A composition according to claim 1 which contains 0.25 to 5 percent by weight of hydroxystearic acid.

3. A nonaqueous gel-forming system adapted to form a tough, elastic film at a slow and controlled rate when mixed with water comprising:
   (A) About 1 to 12 parts by weight of a partially water soluble calcium salt selected from the group consisting of calcium citrate, calcium sulfate, tricalcium phosphate and dicalcium phosphate;
   (B) About 4 to 50 parts by weight of an alginate selected from the group consisting of the alkali metal and ammonium salts of alginic acid; and
   (C) About 20 to 85 parts by weight of a nonaqueous inert liquid vehicle selected from the group consisting of:
      (a) Ethylene glycol, propylene glycol, hexylene glycol and glycerine;
      (b) Polyoxyethylene glycol;
      (c) Ethoxylated lauryl alcohol;
      (d) Polyethylene glycol laurate and polyethylene glycol palmitate;
      (e) Nonylphenoxypolyoxyethylene; and
      (f) A water dispersible liquid system comprising a mixture of:
         (a') a wetting agent selected from the group consisting of ethoxylated lauryl alcohol, ethoxylated oleyl alcohol, ethoxylated lanolin fatty alcohols, polyethylene glycol monolaurate, polyethylene glycol monoleate and nonylphenoxypolyoxyethylene;

(b') mineral oil; and
(c') a fatty acid ester selected from the group consisting of isopropyl stearate and isopropyl myristate; and (D) About 8 to 40 parts by weight of a compound which hydrolyzses slowing in water to yield an acid and which compound is selected from the group consisting of glucono delta lactone, galacto delta lactone, butyro delta lactone valero delta lactone and glutaric anhydride.

4. A method of treating the skin with the composition of claim 1 which comprises, spreading an aqueous suspension of said gel-forming system upon the skin whereon the suspension is allowed to completely gel, and thereafter peeling the gelled mass from the skin.

References Cited in the file of this patent

UNITED STATES PATENTS

| | | |
|---|---|---|
| 2,441,729 | Steiner | May 8, 1948 |
| 2,935,408 | Steinitz | May 3, 1960 |
| 2,996,432 | Modderno | Aug. 15, 1961 |

OTHER REFERENCES

Lesser: Drug and Cosmetic Industry, 61:6, December 1947, pp. 761–2 842–7.

Jannaway: Soap, Perfumery and Cosmetics, 21:10, October 1948, pp. 1003–1005.

Davies: Soap, Perfumery and Cosmetics, vol. 22, April 1949, pp. 365–367.